US006621812B1

(12) United States Patent
Chapman et al.

(10) Patent No.: US 6,621,812 B1
(45) Date of Patent: Sep. 16, 2003

(54) METHOD AND APPARATUS FOR MAPPING VOICE ACTIVITY DETECTION TO A SCHEDULED ACCESS MEDIA

(75) Inventors: John T. Chapman, Cupertino, CA (US); Guenter Roeck, San Jose, CA (US); Sunil Khaunte, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/225,895

(22) Filed: Jan. 4, 1999

Related U.S. Application Data
(60) Provisional application No. 60/107,989, filed on Nov. 10, 1998.

(51) Int. Cl.[7] .................................................. H04J 3/16
(52) U.S. Cl. .................. 370/346; 370/356; 370/443; 370/449
(58) Field of Search ................... 370/428, 429, 370/447, 449, 451, 461, 462, 493, 494, 495, 352, 356, 346, 442, 443; 704/246, 231

(56) References Cited

U.S. PATENT DOCUMENTS

| | | | | |
|---|---|---|---|---|
| 4,340,961 A | * | 7/1982 | Capel et al. | 370/84 |
| 5,297,144 A | * | 3/1994 | Gilbert et al. | 370/95.2 |
| 5,799,012 A | * | 8/1998 | Ayerst et al. | 370/336 |
| 6,064,652 A | * | 5/2000 | Buckland et al. | 370/235 |
| 6,112,084 A | * | 8/2000 | Sicher et al. | 455/426 |
| 6,117,188 A | * | 9/2000 | Aronberg et al. | 717/11 |

OTHER PUBLICATIONS

*IT Standards, Cable Modem Standards* by Jeff Langer dated Feb. 22, 1997 consisting of 3 pages, (http://www,sis.pitt.edu/~mbsclass/standards/langer/cablestl.html).
*Cable Industry Issues Specification for High–Speed Data Delivery* by Mike Schwartz, CableLabs dated Dec. 11, 1996 consisting of 5 pages, (http://www.cablelabs.com/PR/96cable_spec.html).
*Overview of Cable Modem Technology and Services* by Cable Datacom News, undated, consisting of 6 pages, (http://cabledatacomnews.com/cmicl.htm).
*Data Over Cable Interface Specifications, Cable Modem Termination System–Network Side Interface Specification,* SP–CMTS–NSII01–960702, by Arthur D. Little, Inc., dated Jul. 2, 1996 consisting of 17 pages.

* cited by examiner

Primary Examiner—Alpus H. Hsu
Assistant Examiner—Thien Tran
(74) Attorney, Agent, or Firm—Marger Johnson & McCollom, PC

(57) ABSTRACT

Unsolicited grants are allocated a selected time interval for scheduling transmission of audio packets at a network endpoint. A network processing node switches from outputting unsolicited grants to polling for packet transmission requests when Voice Activity Detection (VAD) at the transmitting endpoint stops generating audio packets. The network processing node switches back to outputting unsolicited grants when the endpoint resumes generation of audio packets. The unsolicited grants include one or more additional grants within the selected time interval that flush out one or more audio packets that may already be queued for transmitting. These additional grants reduce the latency normally caused when Voice Activity Detection (VAD) stops and then restarts audio packet transmission.

35 Claims, 7 Drawing Sheets

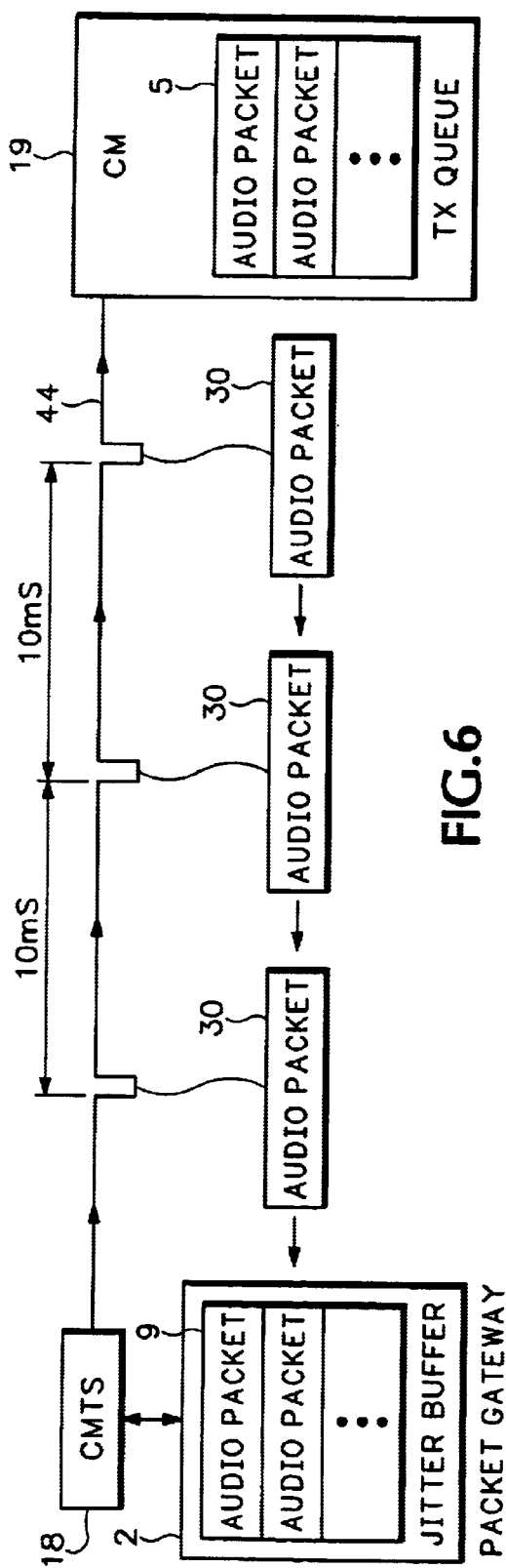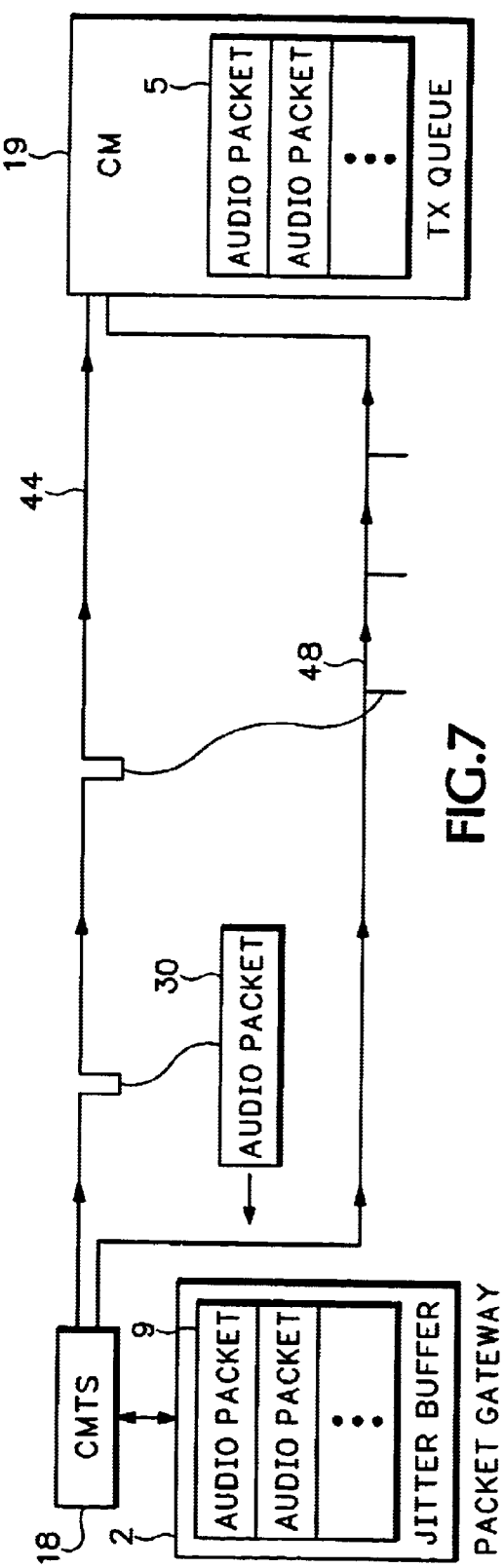

METHOD AND APPARATUS FOR MAPPING VOICE ACTIVITY DETECTION TO A SCHEDULED ACCESS MEDIA

This application claims the benefit of Provisional Application No. 60/107,989, filed Nov. 10, 1998.

BACKGROUND OF THE INVENTION

This invention relates generally to a system for communicating real-time audio, video, and data signals over a packet-switched data network and more particularly to mapping Voice Activation Detection (VAD) to a scheduled access media.

A voice or other type of data stream is transmitted over a packet network by first formatting the data stream into multiple discrete packets. For example, in a Voice over Internet Protocol (VoIP) application, a digitized audio stream is quantized into packets that are placed onto a packet network and routed to a packet telephony receiver. The receiver converts the packets back into a continuous digital audio stream that resembles the input audio stream. A codec (a compression/decompression algorithm) is used to reduce the communication bandwidth required for transmitting the audio packets over the network.

A voice Activity Detection (VAD) is also known as Silence Suppression and is a voice processing technique used in packet switched networks to reduce bandwidth usage. With VAD, a transmitting CODEC sends audio samples only when audio signals are above a set audio energy threshold. For example, audio packets are not generated and transmitted over the packet network when the speaker is not currently talking. Without VAD, audio packets would be generated that contain only background noise.

The receiving CODEC compensates for the silence intervals by inserting silence or comfort noise equal to the perceived background noise of the conversation. VAD reduces the network bandwidth required for conducting a phone conversation and accommodates roughly twice as many voice conversations on the packet-switched network.

One problem with VAD is that additional packet latency is created from the starting and stopping of packet generation and transmission. VAD is also not currently incorporated into scheduled access media, such as cable modem networks. In a cable modem network, packets from multiple cable modems are scheduled for transmission during allocated grants. This grant scheduling adds to the latency already created by VAD.

Accordingly, a need remains for incorporating VAD into a scheduled access media while also reducing VAD induced latency.

SUMMARY OF THE INVENTION

A network processing node allocates unsolicited grants at a selected time interval for scheduling transmission of audio packets. The network processing node switches from allocating unsolicited grants to providing a polling request when Voice Activity Detection (VAD) at a transmitting endpoint stops generating and transmitting audio packets. The network processing node switches back to allocating unsolicited grants when the endpoint starts generating more audio packets.

The unsolicited grants include one or more additional grants within the selected time interval a grant startup that flush out one or more audio packets that may already be queued for transmitting. These additional grants reduce the latency caused by VAD stopping and then restarting audio packet transmission at the endpoint.

The network endpoint transmits the audio packets from a transmit queue. The audio packets arrive in the transmit queue when VAD detects audio signals above a predefined energy threshold. The additional grants sent by the network processing node allow transmission of multiple audio packets from the packet queue during the same grant time interval. This eliminates delays in audio packet playout caused while a receiving jitter buffer waits for a minimum number of audio packets.

In one embodiment of the invention, the network endpoint comprises a Cable Modem (CM) and the network processing node comprises a Cable Modem Termination System (CMTS). VAD is enabled between the CM and the CMTS according to a Data Over Cable System Interface Specification (DOCSIS). However, the invention can be implemented in any scheduled access media or access media protocol.

In another aspect of the invention, a notification is sent to the CMTS immediately after audio activity is detected. The CM then encodes the audio signals while waiting for the CMTS to reallocate grants. Because audio signal encoding is overlapped with CM notification and CMTS grant reallocation, the initial encoding latency is eliminated.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIGS. 6–8 are diagrams showing how packet scheduling is performed for VAD in the cable modem network shown in FIG. 4.

DETAILED DESCRIPTION

Figure 1:
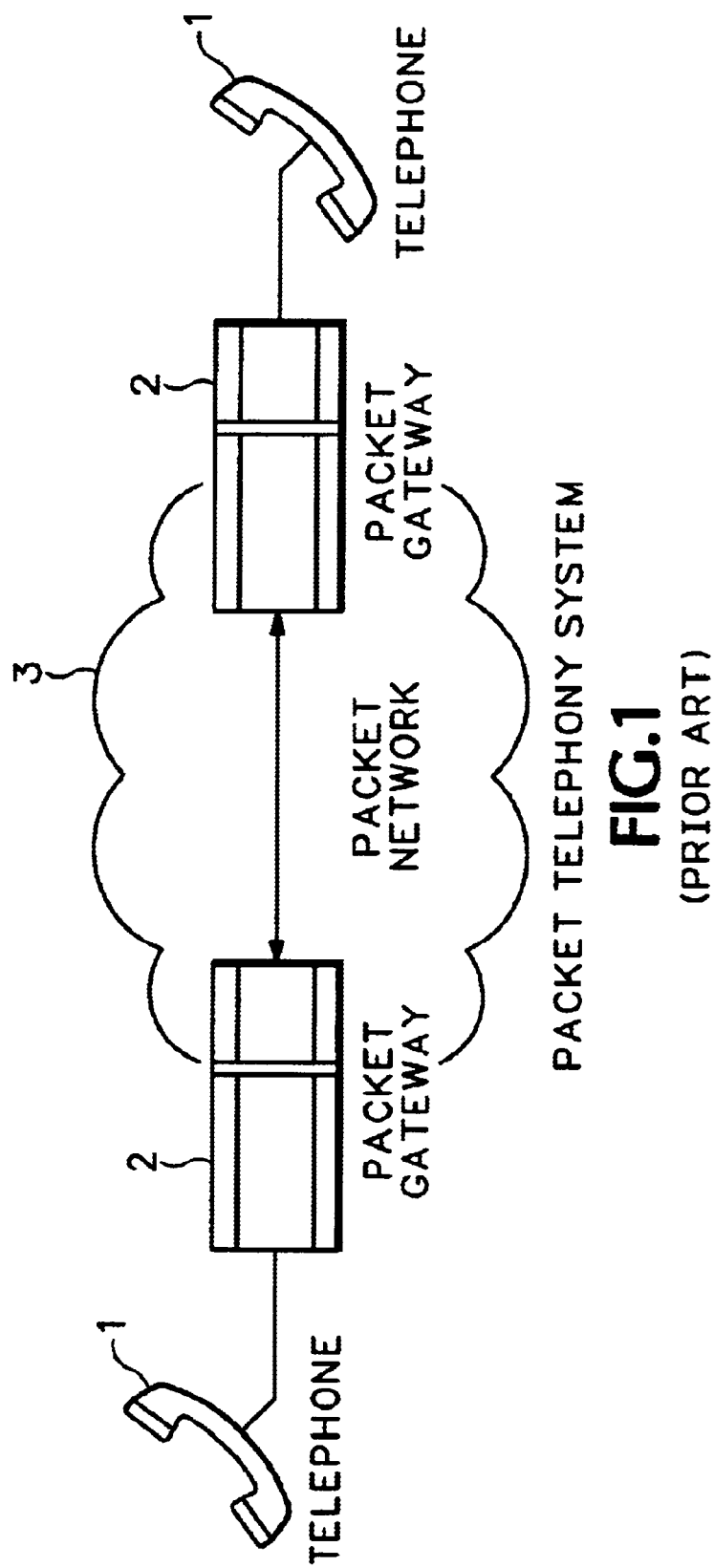
FIG. 1 is a packet-switched network used for transmitting audio signals.

FIG. 1 is a diagram of the general topology of a packet telephony system. The packet telephony system includes multiple telephone handsets 1 connected to a packet network 3 through packet gateways 2. The packet gateways 2 each include a codec for converting audio signals into audio packets and converting the audio packets back into audio signals.

The handsets 1 are traditional telephones or any other device capable of transmitting and/or receiving audio signals. Gateways 2 and the codecs used by the gateways 2 are any one of a wide variety of currently commercially available devices used for connecting the handsets 1 to the packet network 3. For example, the gateways 2 can be Voice over Internet Protocol (VoIP) telephones or personal computers that include a digital signal processor (DSP) and software for encoding audio signals into audio packets.

The gateways 2 operate as a transmitting gateway when encoding audio signals into audio packets and transmitting the audio packets over the packet network 3 to a receiving endpoint. The gateways 2 operate as a receiving gateway when receiving audio packets over the packet network 3 and decoding the audio packets back into audio signals.

Figure 2:
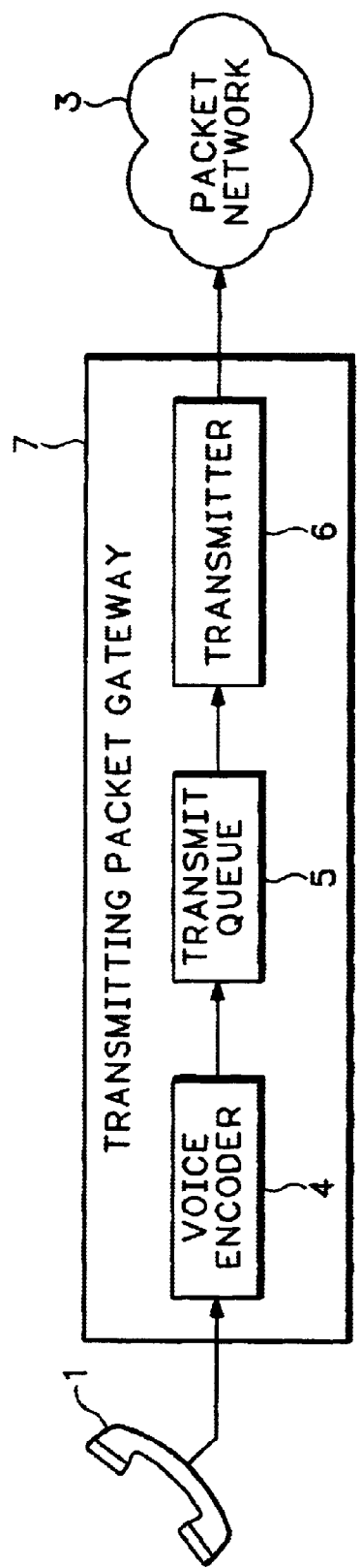
FIG. 2 is detailed diagram of a transmitting packet gateway in the packet-switched network shown in FIG. 1.

A conventional packet telephony gateway transmit path is shown in the transmitting gateway 7 in FIG. 2. The transmitting packet gateway 7 includes a voice encoder 4, a transmit queue 5, and a transmitter 6. Voice encoder 4 implements the compression half of a codec. Transmit queue 5 holds compressed audio packets from encoder 4 formatted for transmission. Transmitter 6 places the queued audio packets onto packet network 3.

Figure 3:
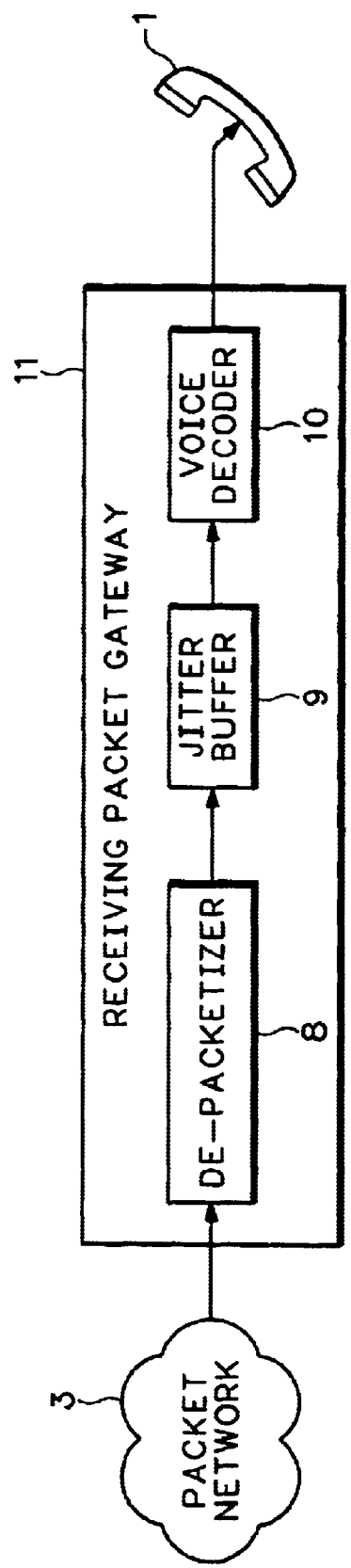
FIG. 3 is detailed diagram of a receiving packet gateway in the packet-switched network shown in FIG. 1.

A receiving packet gateway 11 is shown in FIG. 3. The receiving gateway 11 reverses the process used in transmitting gateway 7 (FIG. 2). A depacketizer 8 accepts packets from packet network 3. A jitter buffer 9 buffers data frames and outputs them to a voice decoder 10 in an orderly manner. The voice decoder 10 implements the decompression half of the codec employed by voice encoder 4 (FIG. 2).

Figure 4:
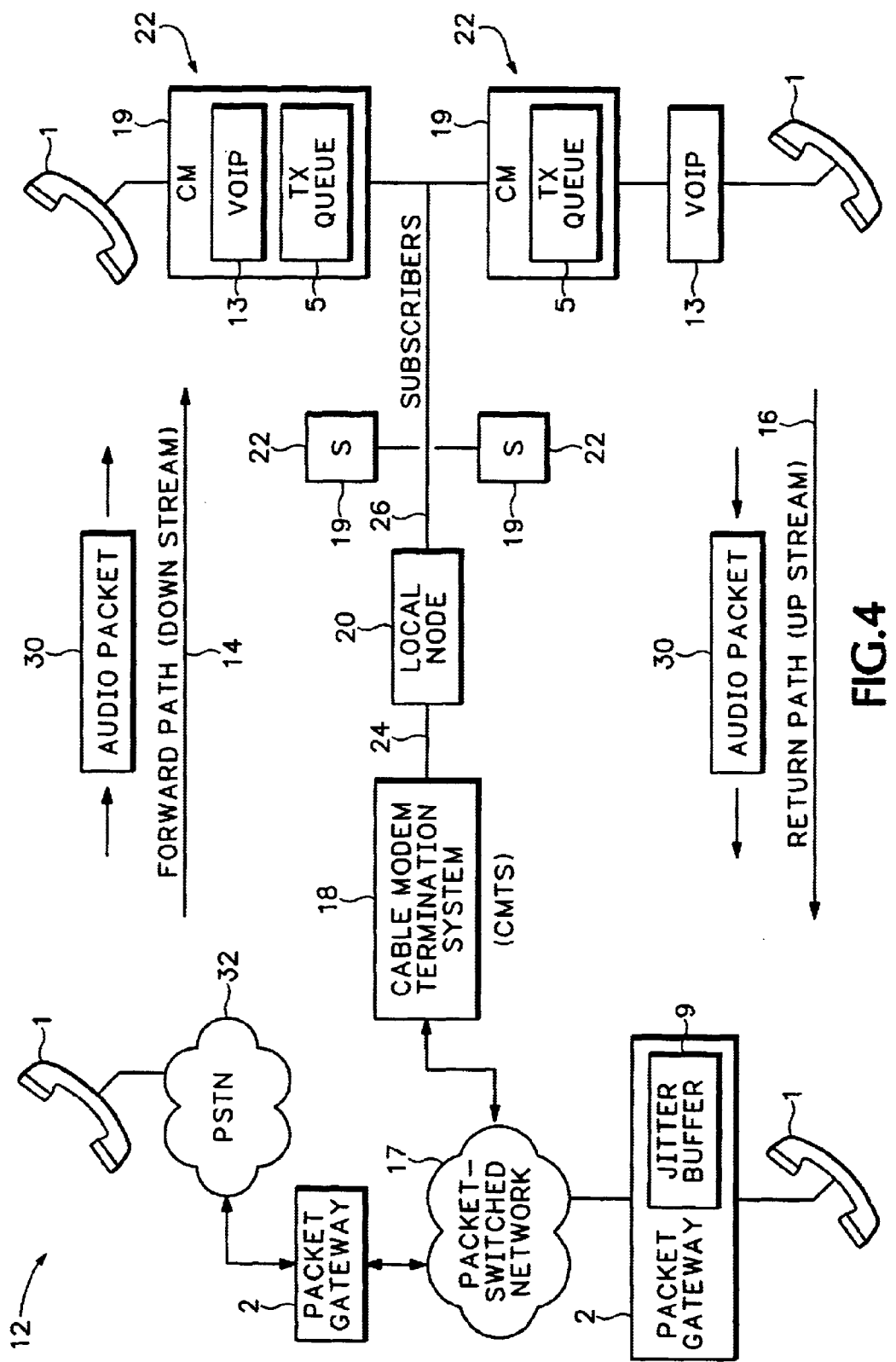
FIG. 4 is a diagram of a cable modem network coupled to the packet-switched network shown in FIG. 1.

FIG. 4 is a block diagram of a cable modem network 12 that is coupled to a packet-switched network 17 similar to the packet-switched network 3 previously shown in FIGS. 1–3. A broadcast media includes links 24 and 26 for transmitting audio packets 30 in both a downstream direction 14 and an upstream direction 16. A head-end 18 is alternatively referred to as a Cable Modem Termination System (CMTS). The CMTS 18 includes a computer data manager located at a cable company central location. The CMTS 18 is coupled through a packet gateway 2 on the packet-switched network 17 to a Public Service Telephone Network (PSTN) 32.

In newer cable installations, the CMTS 18 connects first to a local node 20 over a long haul fiber optic link 24. The local node 20 converts from the fiber optic link 24 to a coaxial cable 26 and distributes cable services to a local area of subscribers 22. In a dense residential area, the local node 20 might have 2 to 4 main coaxial cable (coax) runs 26 that support a total of 300 to 500 subscriber locations 22 (homes) within a 1 to 2 mile radius. The local node 20 can support as many as 2500 homes. Less dense areas have fewer homes and a larger radius. The long haul link 24 is typically between zero to 13 miles with a maximum radius of 100 miles. The CMTS 18 typically supports 40 local nodes 20. Each local node 20 has its own unique upstream path 16. Older cable wiring plants do not have local nodes 20 and drive main cable runs directly from the CMTS 18.

The cable modem system 12 is point-to-point, or multipoint-to-point and operates according a data over cable protocol such as defined in the Data Over Cable System Interface Specification (DOCSIS). There is at least one Cable Modem (CM) 19 at each subscriber location 22 that communicates with the CMTS 18. In both point-to-point and multipoint-to-point, there is only one receiver on the media, such as CMTS 18, that communicates with one or more of the CMs 19.

Network endpoints are locations where a user can access the network. For example, the packet gateways 2 coupled to the packet-switched network 17 are defined as a network endpoints. The subscriber locations 22 are also defined as network endpoints. The network endpoints each include the voice processing elements previously shown in FIGS. 2 and 3. The network endpoints at subscriber locations 22, however, include the CM 19 that allows communication over the cable network 12. The CMs 19 each include an associated transmit queue 5 and a VoIP application 13. The VoIP application 13 includes the voice encode and decode circuitry shown in FIGS. 2 and 3. The VoIP application 13 may be internal to the CM 19 or operate externally from the CM 19 as a stand-alone application.

In one aspect of the invention, Voice Activation Detection (VAD) is enabled in the cable modem network 12 in a manner that reduces call latency. VAD is implemented within the DOCSIS scheduling environment. DOCSIS signaling is described in further detail in co-pending patent application Ser. No. 09/225,894, entitled: METHOD AND APPARATUS FOR SUPPORTING HEADER SUPPRESSION AND MULTIPLE MICROFLOWS IN IP NETWORK, which is herein incorporated by reference.

Figure 5:
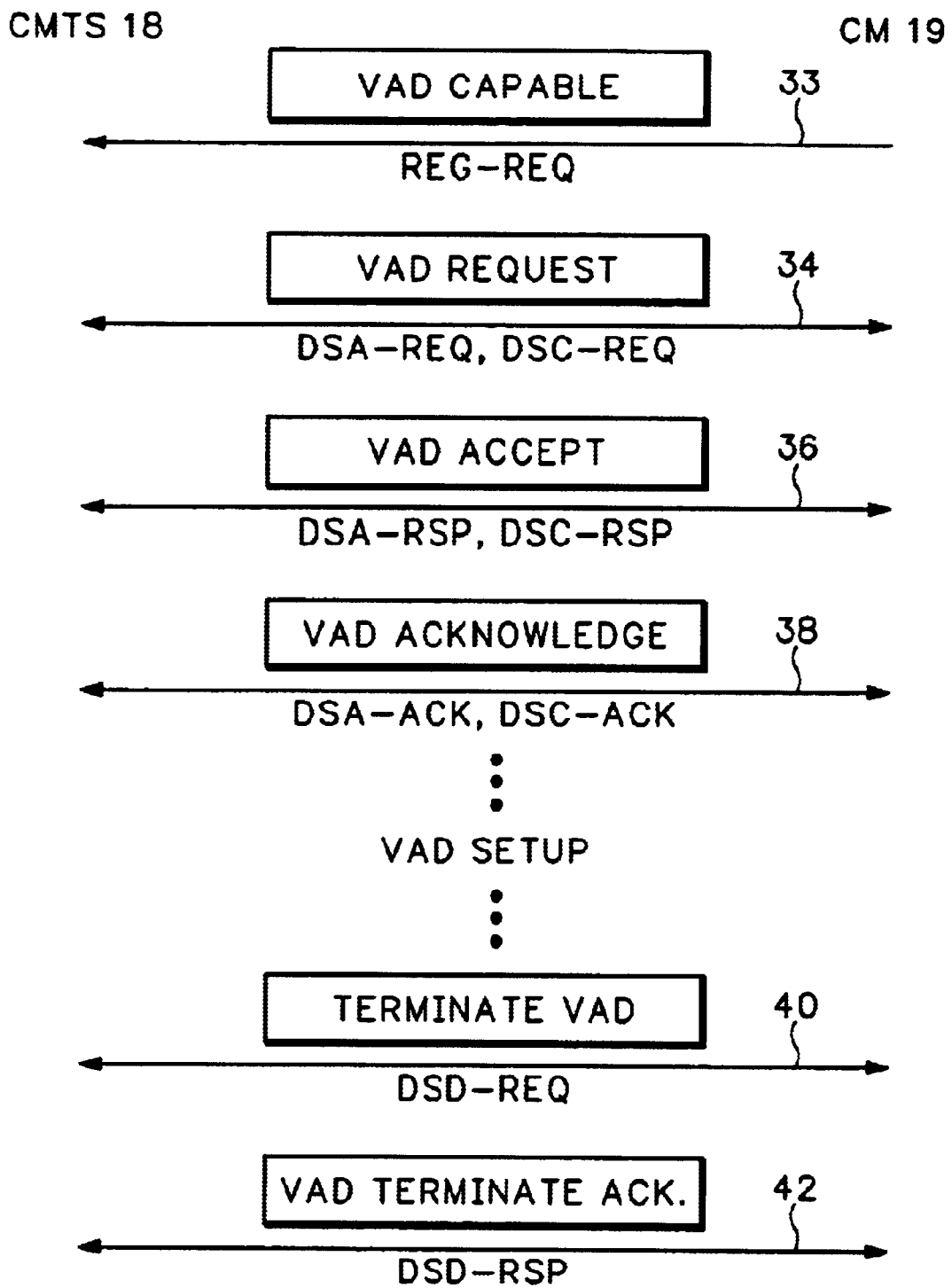
FIG. 5 is a connection diagram showing how Voice Activity Detection is initiated in the cable modem network shown in FIG. 4.

FIG. 5 shows a call flow for initiating VAD in a cable modem network. The CMTS 18 establishes a connection with the CM 19 at one of the subscriber locations 22 (FIG. 4). Each connection between the CMTS 18 and CM 19 is setup using a DOCSIS signaling protocol. The signaling protocol establishes a unique IP flow with each connection. The connection can be initiated by either the CMTS 18 or one of the CMs 19. Handshaking is simply reversed when the CM 19 initiates the connection.

The CM 19 during registration indicates its ability to support VAD through an initial registration request (REG-REQ) 33. A Dynamic Service Addition Request (DSA-REQ) or a Dynamic Service Change Request (DSC-REQ) 34 is sent by the CMTS 18 or CM 19 to initiate VAD. A response signal DSA-RSP or DSC-RSP 36 indicates the VAD request 34 is either accepted or rejected. A DSA-ACK or DSC-ACK signal 38 acknowledges the response signal 36. If accepted, VAD is then enabled between the CMTS 18 and the CM 19. VAD is terminated by sending a Dynamic Service Deletion Request (DSD-REQ) 40. A response to the termination request is responded to by sending a DSD-RSP 42.

Referring to FIG. 6, audio data is transferred in the cable modem network by scheduling unsolicited grants 44. A map is built that describes which CMs 19 get to transmit and for how long. The maps are sent to the CMs 19. When a CM 19 sees an associated grant, data, such as audio packets 30, are sent upstream to the CMTS 18. The links between CMTS 18 and the CMs 19 are identified in the maps using a DOCSIS Service Identifier (SID) field. The audio packets 30 are received by the CMTS 18 and relayed to the jitter buffer 9 of the receiving endpoint associated with an audio packet destination address. For example, the audio packets 30 may be forwarded by the CMTS 18 to another CM 19 in the cable modem network. Alternatively, the audio packets may be forwarded by the CMTS 18 to an endpoint connected to the packet-switched network 17 or an endpoint on the PSTN network 32 (FIG. 4) connected to the packet-switched network 17 via a packet gateway.

FIG. 7 shows what happens when VAD stops audio packet transmission. The voice application at the CM 19 stops generating audio packets 30 when a speaker at the subscriber location 22 (FIG. 4) stops talking. Since there are no packets to send, the CM 19 stops using the unsolicited grants 44 given to it by the CMTS 18. The CMTS 18 detects that the unsolicited grants 44 are not being used and switches to a real time polling service 48.

Figure 8:
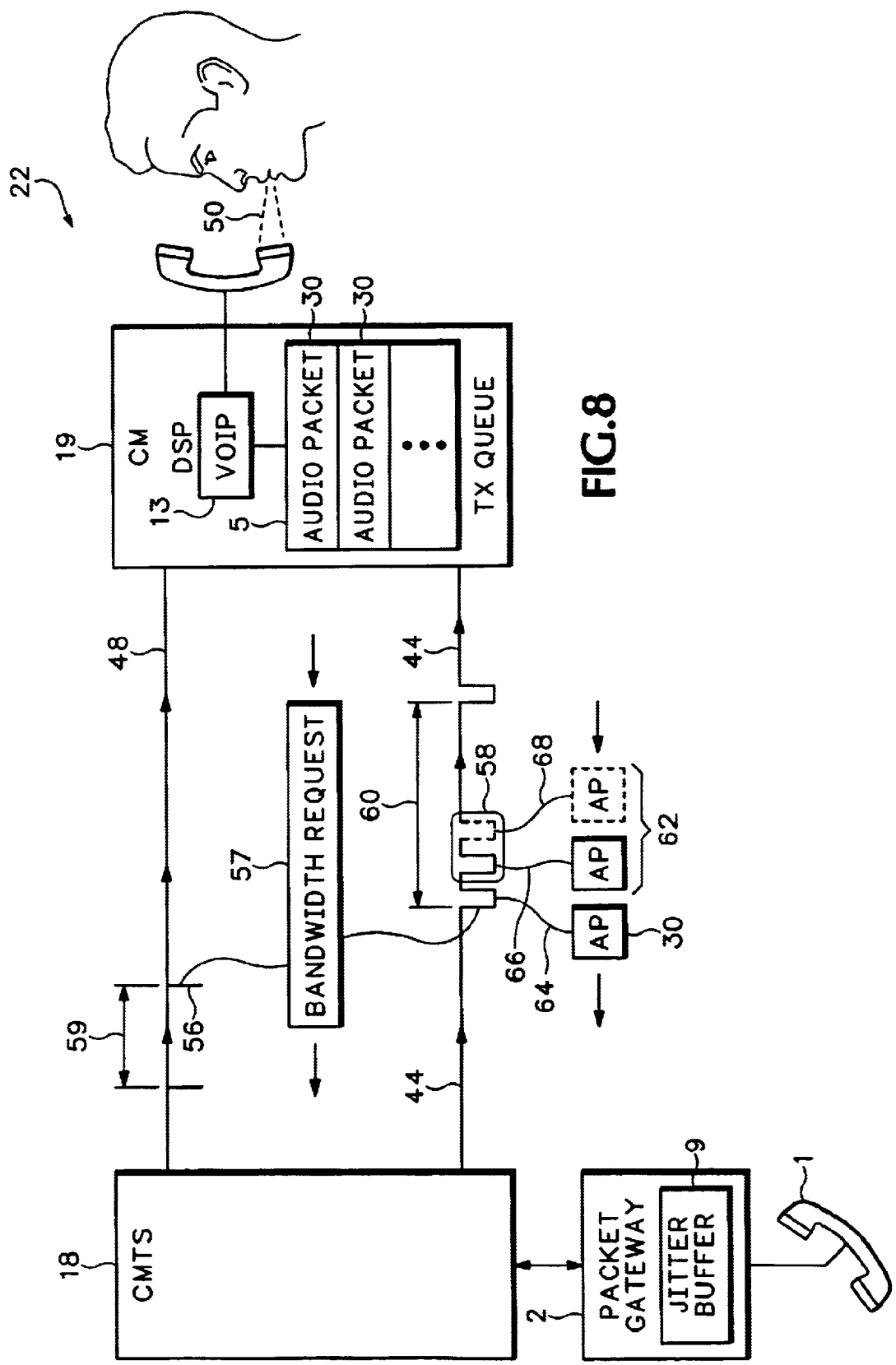

Referring to FIG. 8, the audio application 13 at the CM 19 starts generating audio packets again when audio signals 50 are detected in a new conversation. The audio signals 50 are encoded by encoder 4 into audio packets 30 and received in the upstream transmit queue 5. The CM 19 generates an upstream bandwidth request 57 in a request slot 56 of the polled requests 48. Upon receiving the request 57, the CMTS 18 resumes the unsolicited grant service 44 and discontinues the polled requests 48.

To reduce latency, the CMTS 18 may issue typically one or two additional unsolicited grants 58 within the first unsolicited grant period 60. These extra unsolicited grants 58 allow the CM 19 to empty any packets that may have accumulated in the upstream transmit queue 5. The CM 19 responds to these additional unsolicited grants 58 by transmitting additional audio packets 62 within the grant period 60.

If the additional unsolicited grants 58 are not used, the CMTS 18 still remains in the unsolicited grant mode. If the CMTS 18 does not respond in time with unsolicited grants 44, the CM 19 may limit the number of audio packets 30 held in the transmit queue 5 to limit the incurred latency.

The following configuration parameters can be varied by the CMTS 18.

The number of empty unsolicited grants that are accepted before converting to polled requests.

The period of the polled requests.

The number of additional unsolicited grants.

The spacing in time of the additional unsolicited grants

The maximum number of additional audio calls allowed on a particular upstream path when VAD is running.

The burst of unsolicited grants is necessary because the jitter buffer 9 in the receiving packet gateway typically waits to have a minimum amount of audio samples before beginning audio playout. Thus, the sooner the CMTS 18 recognizes that the CM 19 has packets 30 to send and can empty the transmit queue 5, the lower the latency occurring in the phone call. Note that before the bandwidth request 57 is made, at least one audio packet 30 has already accumulated in the transmit queue 5.

In another aspect of the invention, the VoIP application 13 at subscriber location 22 notifies the CM 19 to send the request 57 before any audio packets 30 are available in transmit queue 5. As soon as voice encoder 4 detects voice signals above the energy threshold level, CM 19 is notified to immediately send request 57. By the time CMTS 18 responds with grants 44, audio packets are encoded and loaded into transmit queue 5. Thus, latency is further reduced by sending request 57 more quickly. VoIP application 13 is typically implemented in software using a Digital Signal Processor (DSP).

The start-up latency is calculated by adding:

The time taken from when the audio signal 50 was recorded to the time that first audio packet 30 arrives in the CM upstream transmit queue 5.

This time is dominated by the audio application.

The time until a polled request 56 is received by the CM 19. The worst case time is a polled request interval 59.

The request-grant response time of the CMTS 18. This value is affected by MAP length and the number of outstanding MAPS. The request grant turn-around time of the CMTS depends upon the map allocation size in milliseconds and the look-ahead time of the CMTS scheduler.

The amount of time between the first unsolicited 64 grant and the number of unsolicited grants 58 required to satisfy the receiving jitter buffer 9.

If the receiving jitter buffer 9 must receive between one and two audio packets before playout, then this delay is the time between the first unsolicited grant 64 and a second unsolicited grant 66. If the receiving jitter buffer 9 requires receipt of between two and three packets, then this delay is the time between the first unsolicited grant 64 and a third unsolicited grant 68.

Figure 9:
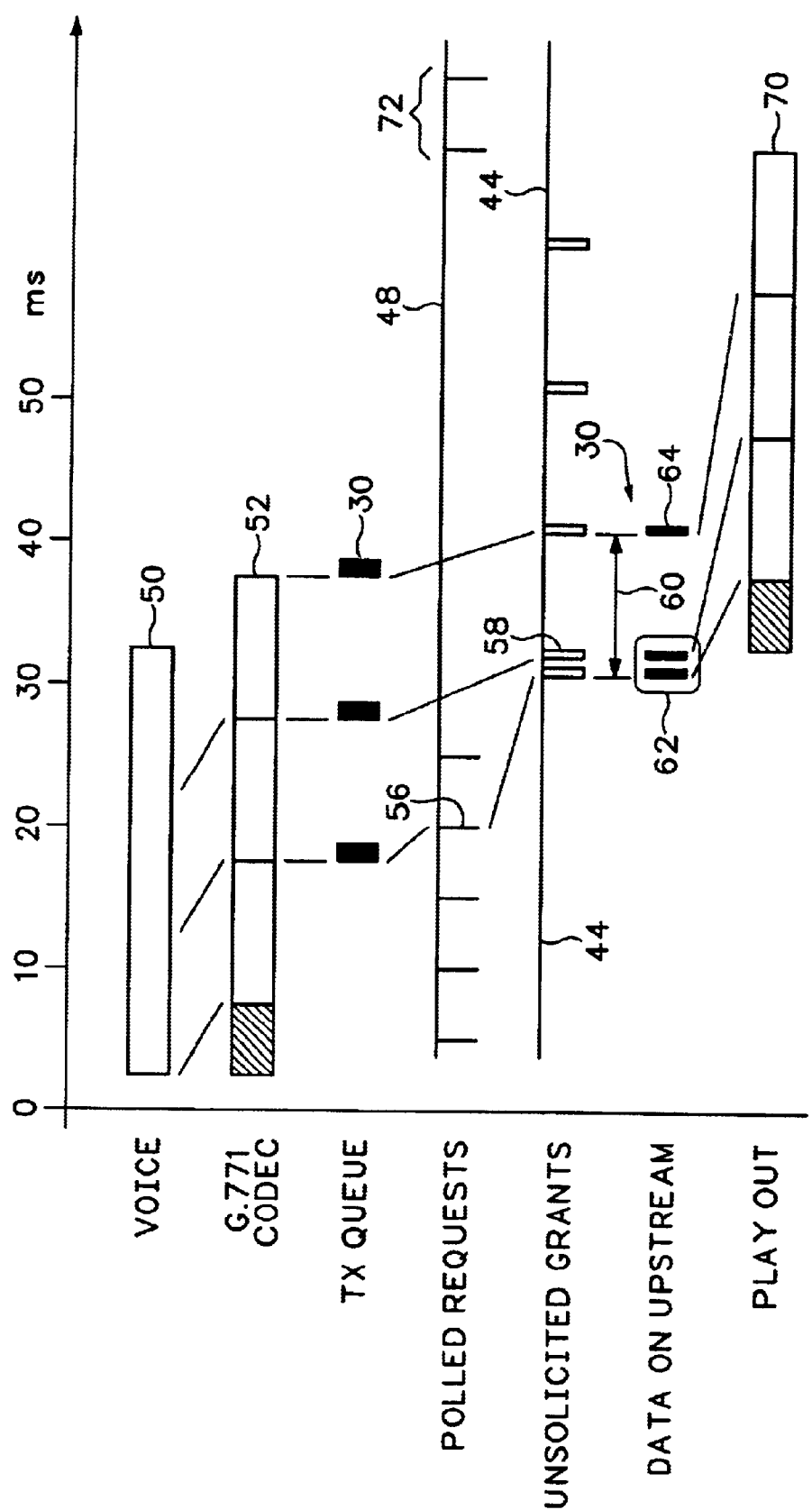
FIG. 9 is a diagram showing an example of how packet latency is reduced when VAD is conducted according to the invention.

FIG. 9 shows the latency caused by VAD and how the invention reduces that latency. Assume a 10 ms, G.711 audio call, and a receive jitter buffer that requires a minimum of 20 milliseconds (ms) of audio samples before it will playout. Assume audio signal 50 begins at time 0. After a nominal processing delay, a DSP CODEC at the CM generates audio packets 30 which are then transferred to the upstream transmit queue.

The next polled request 56 is used resulting in the start up of the unsolicited grants 44. An additional unsolicited grant 58 is immediately issued to clear out the transmit queue. Audio packets 30 traverse the packet-switched network and arrive at the receive jitter buffer 9.

Because the audio packets 62 arrived close together, the jitter buffer 20 ms minimum playout time is immediately met. After a nominal processing delay, audio playout 70 begins. When the audio signal stops, the CMTS detects unused grants, and switches back to the polled requests 72. If addition grant 58 was not generated, playout would not begin until time 64. Thus, addition grant 58 reduces latency by at least 10 ms.

When configuring the CMTS to allow for increased call density, the following factors must be taken into account. VAD allows over provisioning of the upstream. For example, an upstream that might normally handle 24 audio conversations might be over provisioned to as high as 36 (50%) or even 48 (100%) phone calls.

Whenever there is over provisioning, there exists the statistical possibility that all upstream audio conversation may become active. At that time, the CMTS may be unable to schedule all the audio traffic. The CM would respond by stretching out unsolicited grant interval 60. This would have the negative impact of increasing latency for those affected audio calls for the length of the current audio segment. For this reason, the CM may limit the number of audio packets it accumulates.

Occasional saturation of the upstream from CMs to the CMTS during VAD can be eliminated by provisioning both audio and data on an upstream. The maximum number of permitted calls would be equal to or less than the maximum capacity of the upstream with no audio traffic (24 in the previous example). VAD would cause the channel usage to drop from 100% to around 50% for audio, allowing the remaining 50% to be used for data and maintenance traffic.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A system for scheduling transmission of audio packets, comprising:

a network processing node providing unsolicited grants at a selected time interval for enabling audio packet transmissions from a packet sending device;

the network processing node switching from providing the unsolicited grants to providing polled requests for soliciting packet transmissions when the audio packets are not received from the packet sending device in response to the grants; and the network processing node upon receiving a response to the polled requests periodically reissuing the unsolicited grants at the selected time interval to the same packet sending device and also issuing at least one additional unsolicited grant to the same packet sending device between the periodically issued grants.

2. A system according to claim 1 wherein the packet sending device includes Voice Activity Detection (VAD) that discontinues transmission of audio packets to the network processing node when received audio energy is below a predefined threshold.

3. A system according to claim 2 wherein the packet sending device is coupled to the network processing node through a cable medium.

4. A system according to claim 1 wherein the network processing node comprises a cable modem termination system.

5. A system according to claim 2 wherein the network processing nodes uses a cable modem communication protocol to communicate with the packet sending device to control VAD activation.

6. A system according to claim 5 wherein the cable modem communication protocol operates according to a Data Over Cable System Interface Specification (DOCSIS).

7. A system according to claim 6 wherein the network processing node receives a registration notice for identifying VAD capability and receives or generates a request notice for requesting VAD activation, the network processing node receiving or generating a response notice for indicating acceptance or rejection of the VAD request notice and receiving or generating an acknowledge notice for acknowledging the response notice.

8. A system according to claim 7 wherein:
the registration notice comprises a DOCSIS Registration Request;
the request notice comprises a DOCSIS Dynamic Service Change Request or a Dynamic Service Addition Request;
the response notice comprises a DOCSIS Dynamic Service Change Response or a Dynamic Service Addition Response; and
the acknowledge notice comprises a DOCSIS Dynamic Service Change Acknowledge or a Dynamic Service Addition Acknowledge.

9. A system for transmitting and receiving audio packets, comprising:
a network processing device including a packet queue buffering audio packets generated from audio signals;
the network processing device transmitting the buffered audio packets according to grants received periodically at a selected time interval and that terminate when audio packets are no longer transmitted from the packet queue; and
the network processing device generating a notification signal that restarts the periodic receiving of the grants at the selected time interval and upon sending the notification signal also receiving one or more unsolicited grants between the periodically issued grants enabling transmission of at least one additional audio packet within the selected time interval.

10. A system according to claim 9 including an encoder that stops generating audio packets for the packet queue when energy of the audio signals fall below a threshold level.

11. A system according to claim 9 wherein the network processing device is enabled to transmit multiple audio packets by receiving multiple grants within the selected time interval.

12. A system according to claim 9 including a network processing node coupled to the network processing device for outputting the grants, the network processing node switching from outputting unsolicited grants to generating a polling request when the network processing device stops transmitting the audio packets.

13. A system according to claim 9 wherein the network processing device outputs the notification signal immediately after detecting audio signals and encodes the audio signals into audio packets while waiting for the grants to restart.

14. A system according to claim 13 wherein initial encoded audio packets are loaded in the packet queue and ready for transmission before the grants are restarted.

15. A method for transmitting audio packets in a network, comprising:
allocating unsolicited grants to a same endpoint periodically at a selected time interval for scheduling transmission of audio packets;
switching from allocating unsolicited grants to providing a polled transmission request when the audio packets are not transmitted in response to the unsolicited grants;
switching back to allocating unsolicited grants to the same endpoint periodically at the selected time interval when there is a response to the polled transmission request; and
inserting one of more additional unsolicited grants to the same endpoint within the selected time interval after switching back to allocating unsolicited grants.

16. A method according to claim 15 including performing Voice Activity Detection (VAD) to stop transmitting audio packets when audio energy is below a predefined threshold.

17. A method according to claim 15 including the following:
receiving or generating a signal for identifying VAD capability;
receiving or generating a signal for requesting VAD activation;
receiving or generating a signal for indicating acceptance or rejection of the VAD request; and
receiving or generating a signal acknowledging the acceptance or rejection of the VAD request.

18. A method according to claim 17 wherein each signal is received or transmitted each signal according to a Data Over Cable System Interface Specification.

19. A method for scheduling transmission of audio packets, comprising:
encoding audio signals into audio packets;
queuing the audio packets for transmission over a network;
transmitting the queued audio packets according to unsolicited grants received periodically at a given time interval;
terminating packet transmission when no more audio packets are queued;
generating a notification signal to restart unsolicited grant allocation at the periodic time interval when new audio packets are queued for transmission;
receiving one or more additional unsolicited grants within a first one of the periodic time intervals after the unsolicited grant allocation is restarted; and
transmitting multiple audio packets during the same time interval of the reallocated grants in response to received unsolicited grants.

20. A method according to claim 19 including stopping encoding of the audio signals when an energy of the audio signals falls below a threshold level.

21. A method according to claim 19 including:
detecting audio signals above a given energy threshold;
generating the notification signal immediately after detecting the audio signals and at the same time encoding the audio signals into the audio packets; and
queuing the audio packets for transmission while waiting for a response to the notification signal thereby eliminating encoding latency.

22. An electronic storage medium containing computer executable code for transmitting audio packets in a network, the electronic storage medium comprising:

code for periodically allocating unsolicited grants at a selected time interval for enabling transmission of audio packets from an endpoint;

code for switching from allocating unsolicited grants to providing a polled transmission request when the audio packets are not transmitted in response to the unsolicited grants;

code for switching back to periodically allocating unsolicited grants at the selected time interval to the same endpoint when there is a response to the polled transmission request; and code for inserting one or more additional unsolicited grants within one of the same selected time intervals to the same endpoint after switching back to allocating unsolicited grants.

23. An electronic storage medium according to claim 22 including code for performing Voice Activity Detection (VAD) to stop transmitting audio packets when audio energy is below a predefined threshold.

24. An electronic storage medium according to claim 22 including:

code for receiving or generating a signal for identifying VAD capability;

code for receiving or generating a signal for requesting VAD activation;

code for receiving or generating a signal for indicating acceptance or rejection of the VAD request; and code for receiving or generating a signal acknowledging the acceptance or rejection of the VAD request.

25. An electronic storage medium according to claim 24 including code for receiving or transmitting each signal according to a Data Over Cable System Interface Specification.

26. An electronic storage medium storing computer executable code for scheduling transmission of audio packets, the electronic storage medium comprising:

code for encoding audio signals into audio packets;

code for queuing the audio packets for transmission over a network;

code for transmitting the queued audio packets according to unsolicited grants;

code for terminating packet transmission when no more audio packets are queued;

code for generating a notification signal to restart unsolicited grant allocation when new audio packets are queued for transmission; and code for transmitting multiple audio packets during the same time interval of the reallocated grants in response to received back-to-back unsolicited grants to flush out queued audio packets that may have built up since terminating packet transmission.

27. An electronic storage medium according to claim 26 including code for stopping encoding of the audio signals when an energy of the audio signals falls below a threshold level.

28. An electronic storage medium according to claim 26 including:

code for detecting audio signals above a given energy threshold;

code for generating the notification signal immediately after detecting the audio signals and at the same time encoding the audio signals into the audio packets; and code for queuing the audio packets for transmission while waiting for a response to the notification signal thereby eliminating encoding latency.

29. A system for transmitting audio packets in a network, comprising:

means for periodically allocating unsolicited grants at a selected time interval for enabling transmission of audio packets at an endpoint;

means for switching from allocating unsolicited grants to providing a polled transmission request when the audio packets are not transmitted in response to the unsolicited grants;

means for switching back to periodically allocating unsolicited grants at the selected time interval to the same endpoint when there is a response to the polled transmission request; and means for inserting one or more additional unsolicited grants within one of the same selected time intervals to the same endpoint after switching back to allocating unsolicited grants.

30. A system according to claim 29 including means for performing Voice Activity Detection (VAD) to stop transmitting audio packets when audio energy is below a predefined threshold.

31. A system according to claim 29 including:

means for receiving or generating a signal for identifying VAD capability;

means for receiving or generating a signal for requesting VAD activation;

means for receiving or generating a signal for indicating acceptance or rejection of the VAD request; and means for receiving or generating a signal acknowledging the acceptance or rejection of the VAD request.

32. A system according to claim 31 including means for receiving or transmitting each signal according to a Data Over Cable System Interface Specification.

33. A system for scheduling transmission of audio packets, comprising:

means for encoding audio signals into audio packets;

means for queuing the audio packets for transmission over a network;

means for transmitting the queued audio packets according to unsolicited grants;

means for terminating packet transmission when no more audio packets are queued;

means for generating a notification signal to restart unsolicited grant allocation when new audio packets are queued for transmission; and means for transmitting multiple audio packets during the same time interval of the reallocated grants in response to received back-to-back unsolicited grants.

34. A system according to claim 33 including means for stopping encoding of the audio signals when an energy of the audio signals falls below a threshold level.

35. A system according to claim 33 including:

means for detecting audio signals above a given energy threshold;

means for generating the notification signal immediately after detecting the audio signals and at the same time encoding the audio signals into the audio packets; and means for queuing the audio packets for transmission while waiting for a response to the notification signal thereby eliminating encoding latency.

\* \* \* \* \*

UNITED STATES PATENT AND TRADEMARK OFFICE
CERTIFICATE OF CORRECTION

PATENT NO. : 6,621,812 B1
DATED : September 16, 2003
INVENTOR(S) : Chapman et al.

It is certified that error appears in the above-identified patent and that said Letters Patent is hereby corrected as shown below:

<u>Title page,</u>
Item [56], References Cited, OTHER PUBLICATIONS,
"*IT Standards*" reference, "http://www,sis.pitt.edu" should read
-- http://www.sis.pitt.edu. --.

<u>Column 1,</u>
Line 26, change "A voice Activity Detection" to -- Voice Activity Detection --.

<u>Column 5,</u>
Line 21, should read as follows:
-- • The number of empty unsolicited grants that are accepted before converting to polled requests.
  • The period of the polled requests.
  • The number of additional unsolicited grants.
  • The spacing in time of the additional unsolicited grants.
  • The maximum number of additional audio calls allowed on a particular upstream path when the VAD is running. --.
Line 48, should read as follows:
-- • The time taken from when the audio signal 50 was recorded to the time that first audio packet 30 arrives in the CM upstream transmit queue 5. --.
Line 52, should read as follows:
-- • The time until a polled request 56 is received by the CM 19. The worst case time is a polled request interval 59.
  • The request-grant response time of the CMTS 18. This value is affected by MAP length and the number of outstanding MAPS. The request-grant turn-around time of the CMTS depends upon the map allocation size in milliseconds and the look-ahead time of the CMTS scheduler.

UNITED STATES PATENT AND TRADEMARK OFFICE
CERTIFICATE OF CORRECTION

PATENT NO.    : 6,621,812 B1
DATED         : September 16, 2003
INVENTOR(S)   : Chapman et al.

It is certified that error appears in the above-identified patent and that said Letters Patent is hereby corrected as shown below:

Column 5 (cont'd),
- The amount of time between the first unsolicited 64 grant and the number of unsolicited grants 58 required to satisfy the receiving jitter buffer 9. --.

Signed and Sealed this

Thirtieth Day of May, 2006

JON W. DUDAS
*Director of the United States Patent and Trademark Office*